United States Patent [19]

Sanner

[11] 4,246,574

[45] * Jan. 20, 1981

[54] MOISTURE RESPONSIVE SWITCH

[76] Inventor: George E. Sanner, Cypress Hill, Sparks, Md. 21204

[*] Notice: The portion of the term of this patent subsequent to Nov. 19, 1991, has been disclaimed.

[21] Appl. No.: 854,326

[22] Filed: Nov. 23, 1977

Related U.S. Application Data

[60] Continuation-in-part of Ser. No. 676,877, Apr. 14, 1976, Pat. No. 4,061,893, which is a division of Ser. No. 625,350, Oct. 23, 1975, Pat. No. 4,014,359, which is a continuation-in-part of Ser. No. 466,693, May 3, 1974, Pat. No. 3,915,185, which is a continuation-in-part of Ser. No. 272,793, Jun. 18, 1972, Pat. No. 3,848,616, which is a continuation-in-part of Ser. No. 018,829, Feb. 12, 1970, abandoned, which is a division of Ser. No. 456,787, May 18, 1965, Pat. No. 3,500,844.

[51] Int. Cl.³ .................................................. G08B 21/00
[52] U.S. Cl. ............................. 340/602; 137/78.3; 200/61.05; 239/63; 340/527

[58] Field of Search .............. 340/601, 602, 604, 527, 340/529; 200/DIG. 40, 61.04, 61.05, 61.06; 307/118; 324/65 R; 239/DIG. 15, 63, 64; 137/78, 78 A

[56] References Cited

U.S. PATENT DOCUMENTS

| | | | |
|---|---|---|---|
| 3,500,844 | 3/1970 | Sanner | 137/78 |
| 3,848,616 | 11/1974 | Sanner | 137/78 |
| 3,915,185 | 10/1975 | Sanner | 239/63 X |
| 4,014,359 | 3/1977 | Sanner | 340/602 |

Primary Examiner—John W. Caldwell, Sr.
Assistant Examiner—Daniel Myer
Attorney, Agent, or Firm—LeBlanc, Nolan, Shur & Nies

[57] ABSTRACT

A moisture responsive switch is employed for controlling the operation of a fluid operated sprinkling system or the like. The moisture responsive switch provides adjustable time delay means to prevent sprinkler flutter due to intermittent rain fall. Switch recovery time delay means may be adjusted to simulate irrigation evaporation conditions of local geographical terrain. Signal alarm means are provided that signal during precipitation independently of sprinkler system control by the moisture responsive switch.

7 Claims, 13 Drawing Figures

MOISTURE RESPONSIVE SWITCH

BACKGROUND OF THE INVENTION

This application is a continuation-in-part of application Ser. No. 676,877, filed Apr. 14, 1976 (now U.S. Pat. No. 4,061,893) which was a division of application Ser. No. 625,350 filed Oct. 23, 1975 (now U.S. Pat. No. 4,014,359) which was a continuation-in-part of application Ser. No. 466,693, filed May 3, 1974 (now U.S. Pat. No. 3,915,185), which was a continuation-in-part of Ser. No. 272,793, filed June 18, 1972 (now U.S. Pat. No. 3,848,616). The latter was a continuation-in-part of application Ser. No. 18,829 filed Feb. 12, 1970 (now abandoned) which was a division of application Ser. No. 456,787 filed May 18, 1965 (now U.S. Pat. No. 3,500,844).

This invention relates to electrical switching means that are responsive to moisture. There are currently in use, a wide variety of lawn sprinkling systems that are controlled by electrical timers to provide irrigation during a given pre-determined interval of time. When sprinkling is initiated, such systems generally continue to operate during the full preset timing interval, regardless of the presence or absence of natural rainfall. To conserve irrigation water supplies, it is desirable to interrupt the artificial irrigation cycle during periods of natural rainfall; with restoration of artificial irrigation, if natural rainfall should cease prior to termination of the pre-determined artificial irrigation period. To accomplish this, moisture responsive switches have been proposed to interrupt the sprinkler control.

Moisture responsive switches have been known to operate in response to various types of moisture absorptive mechanisms associated with mechanically actuated switches. Such switches are of "volumetric" type in that they depend upon absorption of a given weight of water, or moisture, to mechanically actuate the physical opening and closing of an electrical switch contact. While activation of such switches, in the presence of moisture, is more or less precise, their deactivation is not nearly as predictable. This is because ambient conditions are generally responsible for evaporation of sufficient moisture from the "volumetric" moisture collector, to enable switch deactivation. Such ambient conditions are a function of temperature, humidity, wind velocity and direction, and barometric pressure. These parameters are widely variable in any given location; and, variable to an even greater degree between geographical locations. In conclusion, such devices lack ability to operate in a predictable and controllable manner.

SUMMARY OF THE INVENTION

It is an objective of the present invention to obviate the difficulties of the prior art, and to provide a reliable, low cost, predictable moisture responsive switch for controlling the operation of a sprinkling system, in consonance with the presence of natural rainfall, in a predictable and controllable manner.

Broadly, the moisture responsive actuator includes a housing with a switch and switch actuator located therein, and is provided with a means for electrically connecting the switch into a fluid sprinkling system. A moisture sensitive sensor switch is located exterior of the housing; and when activated, energizes the switch actuator, deactivates the switch and interrupts the sprinkling system. When the sensor switch is deactivated, the switch actuator is de-energized, the switch is activated, and the fluid sprinkling system resumes operation.

A planimetric sensor switch, employing spaced apart electrodes on an insulated base, enables instant switch activation and deactivation, thereby enabling use of simple electronic solid-state circuits to achieve precision, adjustable, predetermined, time delay periods between sensor switch activation and sprinkler system deactivation; and, between sensor switch deactivation and sprinkler system activation. A realistic correlation, between irrigated earth drying time and moisture responsive switch recovery time, is obtained by utilization of a unique combination of the planimetric switch and an evaporation or porous-plug-drain reservoir, or use of an absorptive material that bridges the spaced apart sensor switch electrodes. The resulting combination provides precision controlled moisture switch delay, or recovery time, intervals that range from fractions of a second to several weeks-depending upon the required application.

The unique moisture responsive switch also provides for a signal alarm means that signals when the sensor switch is activated. Audiable and/or visual signal modes are provided.

Mechanization of the moisture responsive switch provides for generation of required time delays by electronic means utilizing solid-state and/or large scale integration electronic logic circuitry to provide greatly extended delay performance in consonance with latest advances in integrated circuit cost reduction. This results in a moisture responsive switch with superior operating characteristics that can be economically manufactured in a small hermetically sealed package. Time delays may be "built-in", or provided remotely, for added installation flexibility.

BRIEF DESCRIPTION OF THE DRAWING

Other objectives and a fuller understanding of the invention are illustrated in the accompanying drawings in which.

DESCRIPTION OF THE PREFERRED EMBODIMENTS

Figure 1:
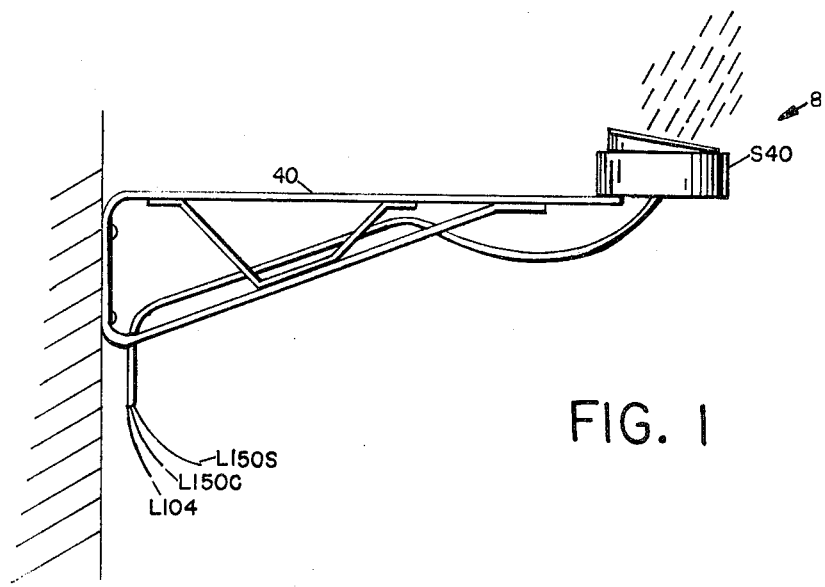
FIG. 1 is a side elevation of the moisture responsive switch.
Figure 2:
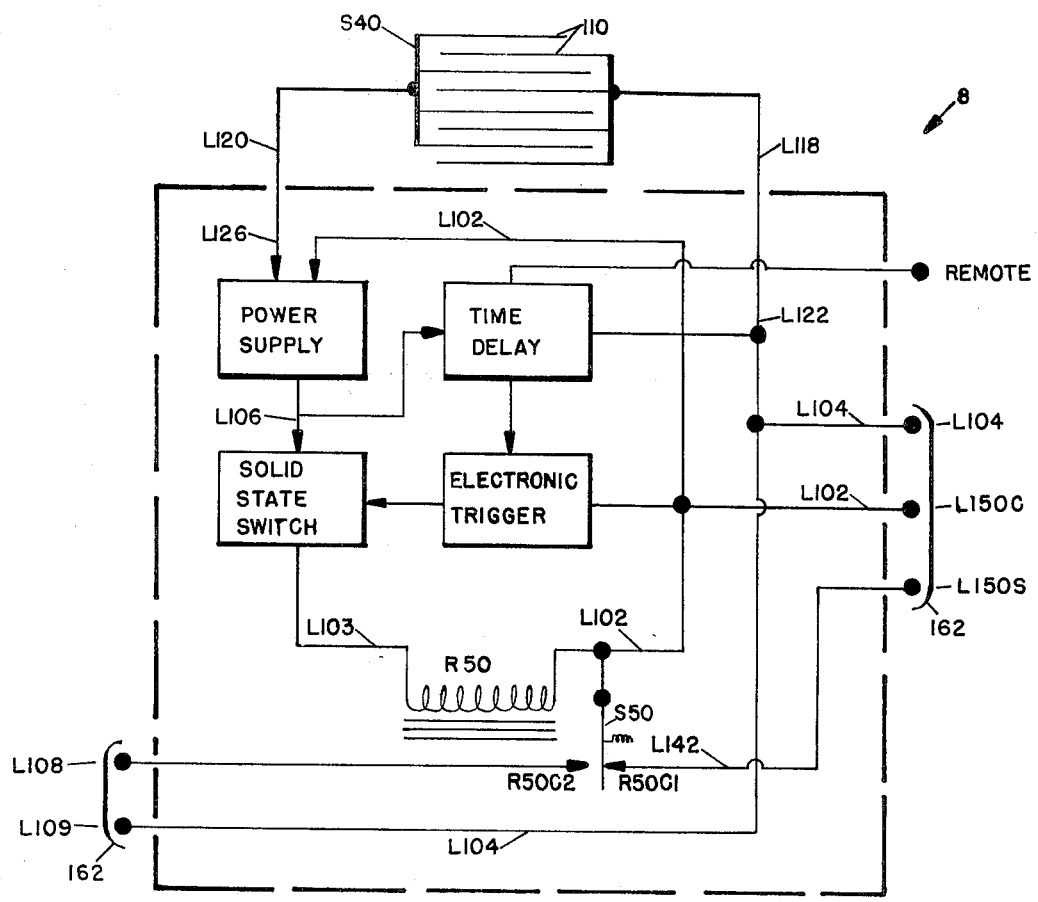
FIG. 2 is a functional schematic diagram of the moisture responsive switch.
Figure 3:
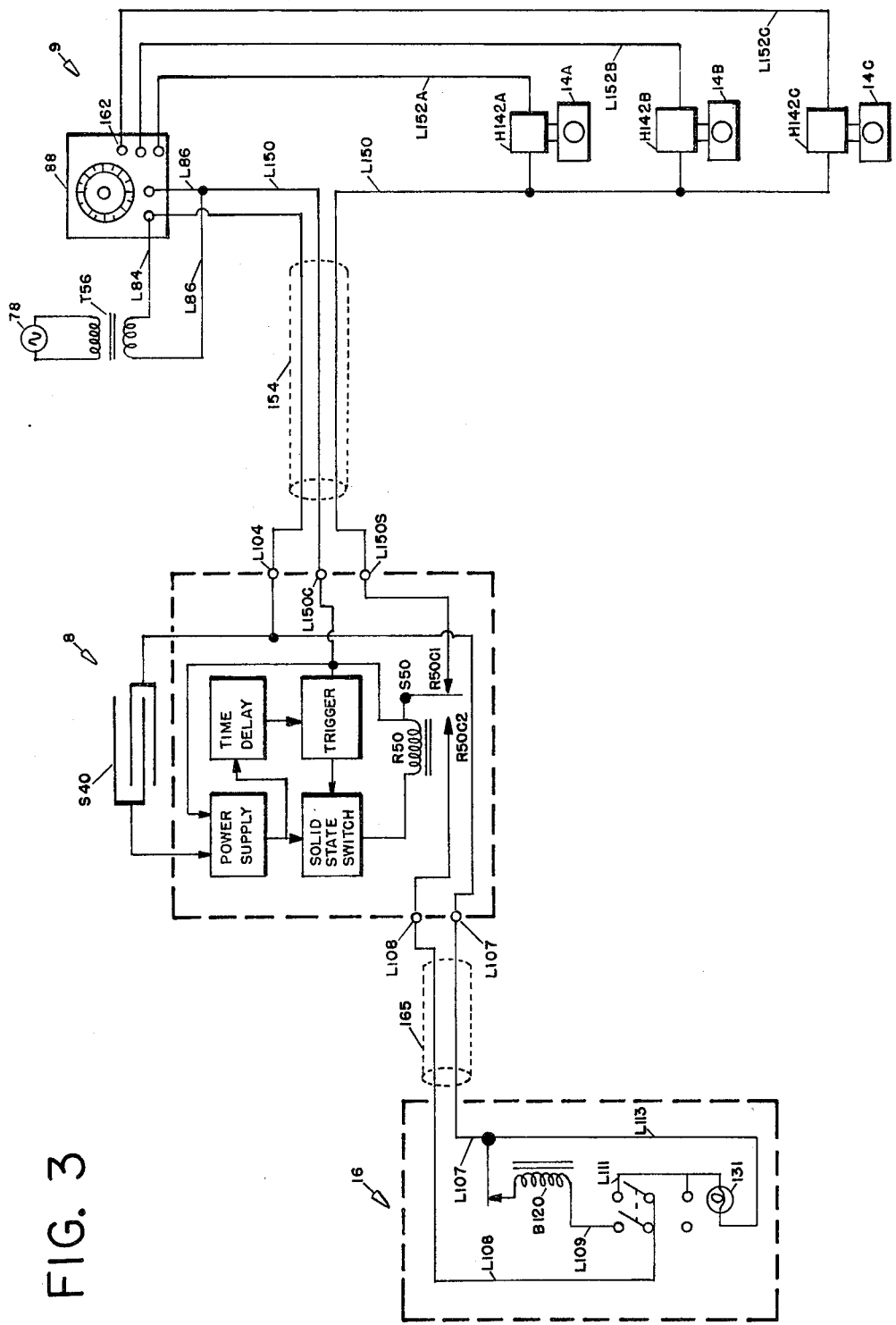
FIG. 3 is a schematic diagram of the moisture responsive switch installed in a typical sprinkler control system with moisture responsive signal alarm attached.

As shown in FIGS. 1 and 2, a moisture responsive switch 8 embodying the invention generally includes a plastic housing 60 which contains a switch S50 and a switch actuator R50. In addition, a moisture responsive sensor switch S40, an integral part of the housing, receives rain or precipitation which causes the sensor switch to be electrically conductive, thereby, being activated. Additionally, conductor means L150C and L150S are in series with an external load, such as a lawn sprinkling system 9 as shown in FIG. 3. Lawn sprinkling is interrupted when switch S50 contact R50C1, in FIG. 2, is open and lawn sprinkling is resumed when contact R50C1 is closed.

A somewhat conventional lawn sprinkling system is shown in FIG. 3, depicting three time sequenced lawn sprinkling valves 14A, 14B and 14C, controlled by electromagnetic actuators H142A, H142B and H142C, respectively. Each value sequentially irrigates a section of lawn as each actuator is sequentially energized by conventional timer switch 88 by means of electrical conductors L152A, L152B and L152C, respectively connected to timer terminals 162. Primary power source 78 is generally reduced to 24 volts AC via transformer T56 which provides power for the lawn sprinkling system 9 via conductor L86/L150 and L84/L152.

The moisture responsive switch 8 is connected into sprinkler system 9 via conductors L150C and L150S which place switch S50 contact R50C1 in series with sprinkler system power conductor L150. When switch S50 actuator R50 is energized, switch S50 contact R50Cl is opened, sprinkler 9 power conductor L150 is interrupted, and sprinkling is terminated. Upon de-energization of switch S50 actuator R50, switch S50 contact R50C1 closes, conductor L150 continuity is restored and sprinkling resumes.

The moisture responsive switch 8, switch S50 actuator R50, is energized when remote sensor switch S40 conducts a source of low voltage (see FIGS. 2 and 3) which may be derived, for example, from the external load via conductors L84, L104, L122, L118, S40, L120, L126, L106, L103, R50, L102, L150C, L150 and L86. In the presence of moisture, S40 conducts, R50 is energized, switch R50 contact R50C1 is opened and sprinkling is interrupted. In absence of moisture, S40 is deactivated, R50 is de-energized, switch S50 contact R50C1 is closed, and lawn sprinkling resumes. The moisture responsive switch 8 shown in FIG. 1 may be connected into a conventional lawn sprinkling system 9 as shown in FIG. 3 by means of electrical cable 154.

Figure 4:
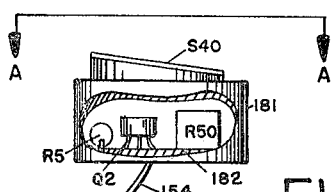
FIG. 4 is an elevation view of the moisture responsive switch of FIG. 1, showing electronic components in housing interior.
Figure 5:
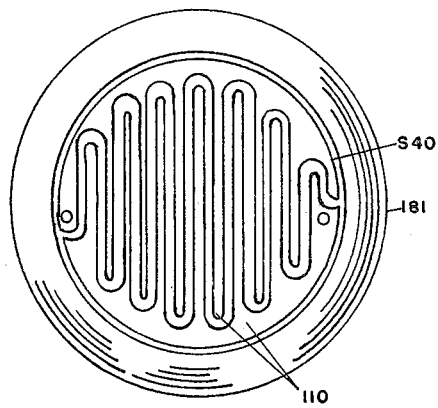
FIG. 5 is a section view taken along line A—A of FIG. 4.

Moisture responsive sensor switch S40 is shown in FIGS. 1 and 4 as an integral part of housing 60/181, and may be of printed circuit configuration. Such a planimetric switch is shown in FIG. 5, which is a section view along line A—A of FIG. 4. Spaced apart electrodes 110 are etched from a copper-clad laminate such that when moisture bridges electrodes 110, switch S40 is conductive. Switch S40 may be mounted on housing 60/181 at an angle, such that precipitation will gravity-flow from the sensor switch surface at substantially the same rate at which it impinges thereon. During the course of natural rainfall, and particularly during initial or final periods thereof, rainfall impinging upon sensor switch S40 may be intermittent, causing switch S50 contact R50C1 to randomally flutter. This may result in erratic operation of sprinkler valves 14A, 14B and 14C in FIG. 3. Such operation is undesirable and could cause "hammer" in sprinkler systems. Accordingly, time delay is introduced between activation of sensor switch S40 and deactivation of switch contact R50C1. In this arrangement, switch S50 will be energized at a given predetermined time interval after sensor switch S40 is activated. Thus, control of the external load 9 will be definite, positive and not subject to intermittent operation.

Figure 6:
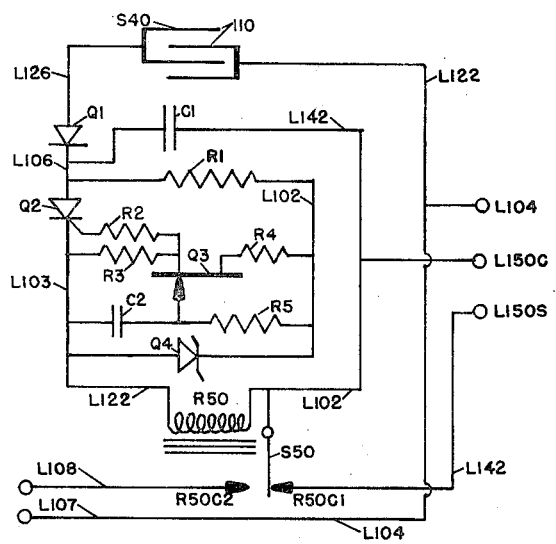
FIG 6 is a typical embodiment of an electronically delayed moisture responsive switch in accord with the principals of the present invention.

Time delay may be achieved by means of thermal switches such as conventional "Amperex" tubes or it may be accomplished by electronic means as shown in FIGS. 2 and 6. Switch actuator R50 is energized by power conductors L122 and L102 as herebefore described. When remote sensor switch S40 is conductive, power appears on conductor L106 from the power supply $Q_1$ that is energized via conductors L126 and L102. A desired pre-determined time delay is selected, for example, by adjusting $R_5$ or $C_2$, causing electronic trigger $Q_3$ to close solid-state switch $Q_2$, thereby energizing actuator R50. The mechanization shown in FIG. 6, for example, is available in somewhat commercial type delay-on-operate relays; and, such components may be mechanized into the novel moisture responsive switch as shown in FIG. 4. Additionally, other delay techniques utilizing integrated circuit chips in LSI (large scale integration) linear circuit arrangements may be utilized to provide the required time delay between activation of sensor switch S40 and opening of switch contact R50C1; and/or, deactivation of sensor switch S40 and closing of switch contact R50C1. Time delay control, such as $R_5$ in FIG. 6 may be fixed, or variable. For example, a variable potentiometer may be contained on, or remote from, housing 60 to provide a "sensitivity" control of the moisture responsive switch.

Figure 7:
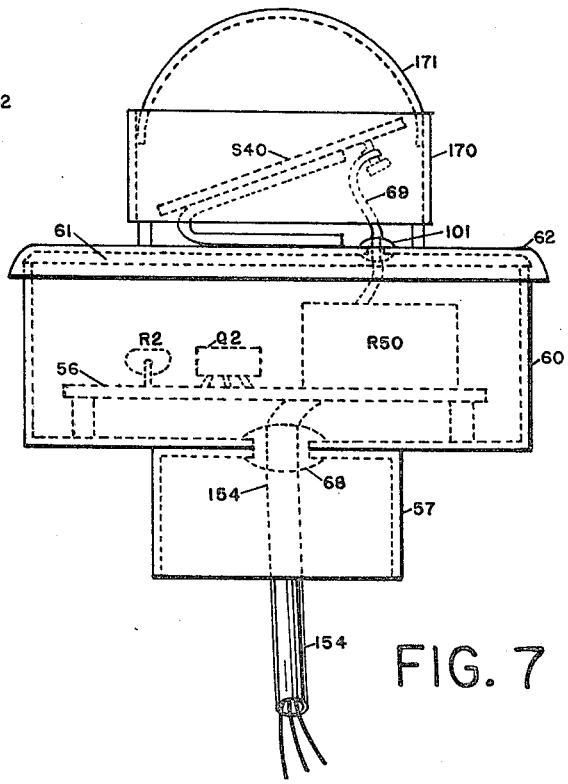
FIG. 7 is an elevation view of a typical mechanization embodiment of the moisture responsive switch in accord with the principles of the present invention.
Figure 8:
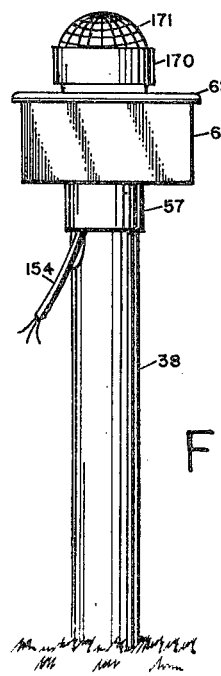
FIG. 8 is an elevation view of the switch of FIG. 7 in a typical installation.

FIG. 4 shows a plastic housing into which may be moulded the necessary electronic parts. FIG. 7 shows an elevation of a fabricated arrangement of the moisture responsive switch wherein a convential, commercially available time delay relay, mounted on a printed circuit board 56, is housed in a case 60, hermetically sealed with cover 62 and seal 61. Remote sensor switch S40 is erected in cylindrical stack 170 and protected by the screen dome 171, through which rain enters and impinges upon the surface of switch S40. Stack 170 is supported slightly above cover 62 permitting water to drain from switch S40 at substantially the same rate at which it enters screen 171. Switch S40 conductors L126 and L122 are contained in cable 69 which enters housing 60 through hermetically sealed bushing 101. This version of the novel moisture responsive switch is shown in FIG. 8 supported on a cylindrical vertical stanchion 38 by means of cap 57. Connection to a sprinkler system, or other external load 9 may be made by a single hermetically sealed cable 154 and bushing 68 shown in FIG. 7. As shown in FIG. 8, cable 154 may be brought from the unit through a slot at one extremity of stanchion 38, or may be contained within stanchion 38.

Figure 9:
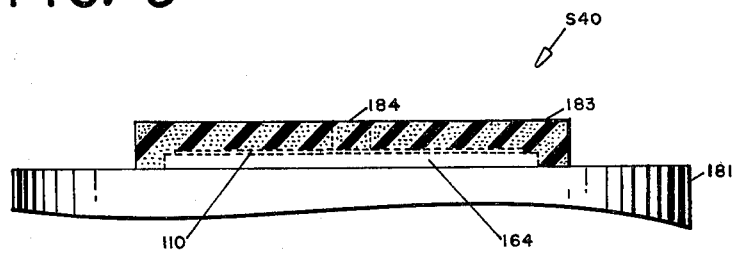
FIG. 9 is a partial elevation view of the moisture responsive switch wherein moisture absorptive material bridges sensor switch electrodes.
Figure 10:
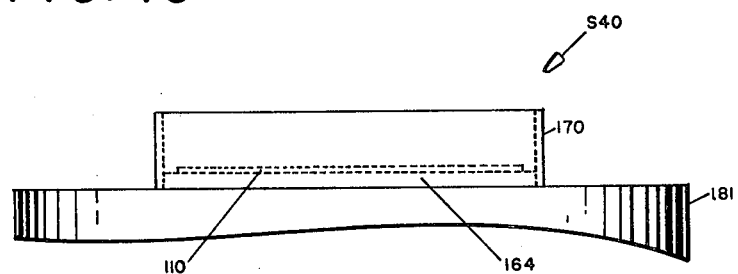
FIG. 10 is a partial elevation view of the moisture responsive switch wherein sensor switch is housed in a reservoir.
Figure 11:
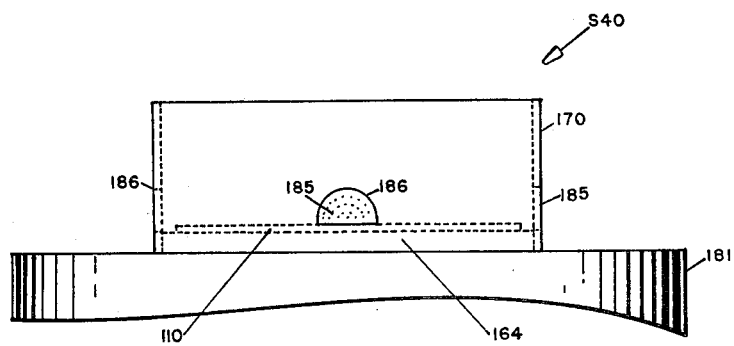
FIG. 11 is a partial elevation view of the moisture responsive switch wherein reservoir moisture retainer walls are fitted with porous drain plugs.

It is often desirable, in some geographical locations to provide pre-determined time delays, that are of the order of time periods equivalent to those required for prevailing winds to cause sufficient evaporation of moisture from the earth, before artifical irrigation is applied. Accordingly, as shown in FIG. 9, the moisture responsive switch S40 may be combined with a quasi-electrolytic moisture absorptive material 183 which bridges spaced-apart electrodes 110 located on insulated base 164 of housing 181. There may be one or more holes 184 in absorptive material 183, through which precipitation may impinge directly upon sensor switch S40, causing it to be activated. However, absorptive material 183 will absorb precipitation during the period of natural rainfall, thereby holding sensor switch contacts 110 activated until all moisture has evaporated from absorptive material 183. Absorptive material 183 may be selected to release its moisture, through evaporation, at substantially the same rate as does the local geographical terrain. Alternatively, sensor switch S40 insulated base 164 may be fitted with a "snap-on" section of cylinder 170 that forms a precipitation collection reservoir, as shown in FIG. 10. Cylindrical sections 170 of various heights, may be used to provide proper reservoir volumes that simulate evaporation times substantially equivalent to those required by local geographical terrain conditions. Finally, as shown in FIG. 11, reservoir 170 walls may be provided with drain holes 186, into which are fitted porous plugs 185, thereby enabling control of pre-determined time delay by judicious selection of plug porosity. Such sensor switch recovery times override electronic time delays (3 seconds to 30 minutes) herebefore described and enable their extension to periods of several days or weeks. Accurate control of these extended time periods is economically feasible by means of the novel arrangements described. Additionally, the unique design enables the moisture responsive switch to be easily, quickly, and economically adapted, by the user, for any geographical location and land terrain.

Figure 12:
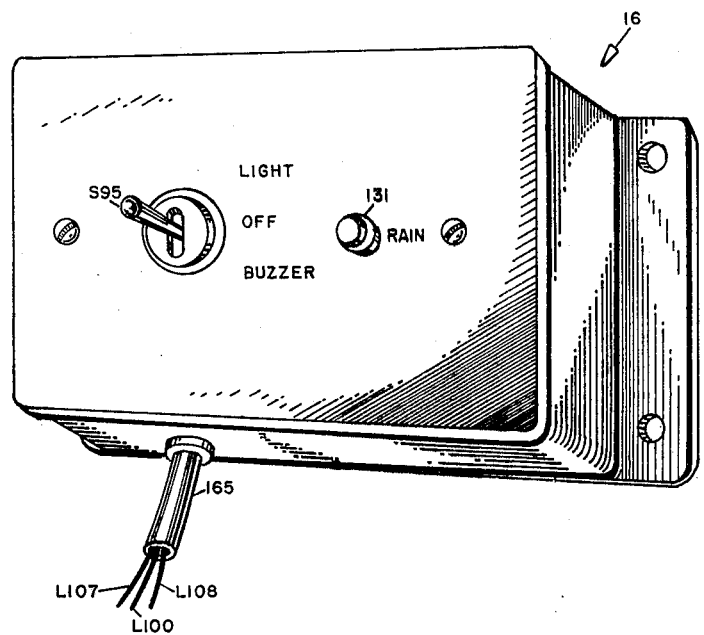
FIG. 12 is a pictorial view of the remote signal alarm in accord with the principals of the present invention.
Figure 13:
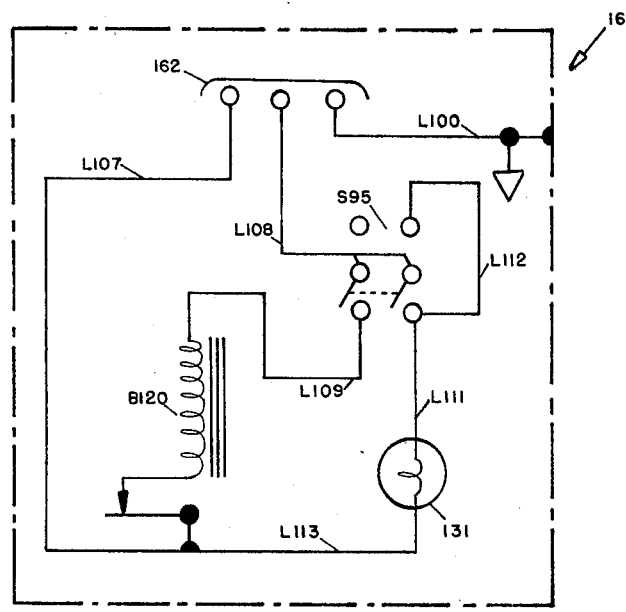
FIG. 13 is a schematic diagram of the remote signal alarm of FIG. 12.

The novel moisture responsive switch may be provided with a signal alarm means by adding an additional contact R50C2 to switch S50 in a SPDT (single pole double throw) arrangement. The alarm circuit 16 may be mechanized as shown in FIGS. 3 and 13, included as an integral part of housing 181/60; or it may be remoted in a separate housing shown in FIG. 12 and energized by cable 165. In FIGS. 2 and 3, when sensor switch S40 is activated by precipitation, switch S50 actuator R50 is energized causing contact R50C1 to open (interrupting conductor L150) and contact R50C2 to close. When contact R50C2 closes, voltage present across conductors L104 and L150C will be present across conductors L108 and L107 respectively; continuity of conductors L150C and L108 is established via conductors L102, S50, and R50C2. Thus alarm signal terminal 162 conductors L107 and L018 will be energized when remote sensor switch S40 is activated, independently of the status of external load 9.

When signal alarm voltage is present on conductors L107 and L108, FIG. 13 shows that if signal alarm mode switch S95 connects conductor L108 to conductors L108/L111, both buzzer B120 and indicator light 131 will be energized. However, if mode switch S95 connects only conductor L108 to conductor L112, only indicator light 131 will be energized via conductors L111, L113 and L017. Finally, if mode switch S95 is placed in a neutral position, conductor L108 will not be connected, and the signal alarm will be disabled.

Various modes of carrying out the invention are contemplated as being within the scope of the following claims particularly pointing out and distinctly claiming the subject matter which is regarded as the invention.

I claim:

1. A moisture responsive actuator which comprises: a housing; an electrical switch and an electrical switch actuator located in said housing; load circuit means for connecting said electrical switch to an electrical load external of said housing; a moisture responsive sensor switch located exterior of said housing; sensor switch circuit means for so connecting said sensor switch, said electrical switch actuator and a power source in series that, when said sensor switch is activated, said electrical switch actuator is energized, said electrical switch is deactivated and said external electrical load is de-energized and that, when said sensor switch is deactivated, said electrical switch actuator is de-energized, said electrical switch is activated, and said external electrical load is energized; said sensor switch being constructed to avoid retention of water on the surface thereof; and said sensor switch circuit means comprising time delay means for delaying the deactivation of said electrical switch for a predetermined time interval after said sensor switch is activated.

2. A moisture responsive actuator which comprises: a housing; an electrical switch and an electrical switch actuator located in said housing; load circuit means for connecting said electrical switch to an electrical load exterior of said housing; a moisture responsive sensor switch located external of said housing; sensor switch circuit means for so connecting said sensor switch, said electrical switch actuator and a power source in series that, when said sensor switch is activated, said electrical switch actuator is energized, said electrical switch is deactivated, and said external electrical load is de-energized and that, when said sensor switch is deactivated, said electrical switch actuator is de-energized, said electrical switch is activated, and said external electrical load is energized; said sensor switch being constructed to avoid retention of water on the surface thereof; said sensor switch circuit means comprising time delay means for delaying the deactivation of said electrical switch for a predetermined time interval after said sensor switch is activated; and said sensor switch circuit means comprising a further time delay means for delaying the activation of said electrical switch for a predetermined time interval after said sensor switch is deactivated.

3. A precipitation responsive actuator comprising: a housing; an electrical switch and a switch actuator means located in said housing; load circuit means for connecting said electrical switch to an electrical load exterior of said housing; a moisture responsive sensor switch located exterior of said housing; and a sensor switch circuit means for connecting said sensor switch, said electrical switch actuator and an actuator power source in series; said sensor switch being constructed to avoid retention of moisture on a surface thereon after cessation of precipitation; said switch and switch actuator means comprising a time delay relay including a relay actuator and a single moveable pole double contact switch comprising a first and a second contact; and said load circuit means being so connected in series with said relay first contact that: (a) when said sensor switch is deactivated said switch actuator is de-energized, said relay first contact closes, and said exterior electrical load is energized; (b) said relay first contact opens and said relay second contact closes at the end of a given predetermined time interval after said sensor switch is activated, thereby providing a delay of said predetermined time between said sensor switch activation and said external electrical load de-energization; and (c) said relay first contact closes and said relay second contact opens immediately upon deactivation of said sensor switch, thereby causing immediate energization of said external electrical load when said relay actuator is de-energized; and said actuator further comprising a signal alarm so connected in series with an alarm power source and said second contact that (a); when said second contact is closed said alarm is activated; (b) when said second contact is interrupted said alarm is deactivated; (c) said alarm signals when said sensor switch is activated; and (d) said alarm provides no signal when said sensor switch is not activated.

4. The moisture responsive actuator of claim 3 wherein said signal alarm comprises: an electrically actuated audible buzzer, a visual indicator light, and a double pole, three position, rain alarm selector switch; said relay second contact is connected in series with one terminal of said alarm power source and both pole terminals of said alarm switch; the remaining terminal of said alarm power source is connected to one terminal of said buzzer and to one terminal of said visual indicator light thereby providing a source of low operating voltage to said rain alarm when said time delay relay second contact is closed; opposite terminals of said buzzer coil and said visual indicator light are each connected to a terminal of one pair of said alarm switch terminals providing continuity when said alarm switch is in a first position; said visual indicator light remaining terminal is also connected to one terminal of a third pair of said alarm switch terminals providing said alarm switch continuity when said alarm switch is in a third position; and the remaining pair of said alarm switch terminals are not connected and thereby provide no switch continuity when said alarm switch is in a second position; whereby, during periods of precipitation, said signal alarm provides a simultaneous audible and visual alarm when said alarm switch is in said first position, no alarm when said alarm switch is in said second position, and a visual alarm when said alarm switch is in said third position.

5. A precipitation responsive actuator comprising: a housing; an electrical switch and an electrical switch actuator located in said housing; external electrical load circuit means for connecting said electrical switch to an electrical load external of said housing; a moisture responsive sensor switch including an insulating member having a surface which is adapted to be oriented to receive rain thereon and first and second spaced apart conductor means on said surface and connected in a series circuit with a power source and said switch actuator; said spaced apart conductor means being adapted to be electrically connected by moisture on said insulating surface thereby completing the continuity of said series circuit, causing said switch actuator to be energized, interrupting a contact of said electrical switch, and de-energizing said external electrical load circuit means during periods of percipitation and, upon cessation of said precipitation, interrupting the continuity of said spaced apart conductor means, causing said series circuit continuity to be interrupted, de-energizing said switch actuator, closing said electrical switch contact, and energizing said external electrical load circuit; a moisture responsive sensor switch casing housing said switch; said casing being disposed on the exterior surface of the top cover of said housing and having a right circular cylinder configuration with one peripheral extremity supported parallel to, and slightly apart from, said housing top cover exterior surface; a rigid wire screen assembly of the other peripheral extremity on said casing; said moisture responsive sensor switch being mounted at an angle in said casing, enabling precipitation to enter said casing interior through said screen, impinge upon said insulating surface of said sensor switch, gravity flow from said insulating surface, and exit from between said one peripheral casing extremity and said top cover exterior surface; a hermetically sealed cable extending from said spaced apart conductor means through said housing top cover to connect said spaced apart conductor means into said series circuit; and a hermetically sealed bushing that extends from the exterior surface to the interior surface of said housing cover in surrounding relationship to said cable for isolating the interior of said housing from the ambient surroundings.

6. In combination: a precipitation responsive actuator as defined in claim 5; a vertical cylindrical stanchion; and a cylindrical cap attaching said housing to one extremity of said stanchion; said housing having a base; said cap having a flat circular surface and a cylindrical wall; an exterior flat circular surface of said cap centrally abutting and being attached to an exterior surface of said housing base; a center hole extending from the interior of said housing base to the interior of said cap; a hermetically sealed bushing in said hole; the cylindrical wall of said cap being telescoped over the exterior thereof, one extremity of said vertical stanchion thereby providing means for supporting said moisture responsive actuator above the ground; said external electrical load circuit means and said power source conductors extending through said bushing in said center hole; and there being means in said housing for electrically connecting said external load and said power source to said moisture responsive actuator.

7. The combination of claim 6 wherein said load and said power source are connected to said moisture responsive actuator by a multiple-conductor cable; said cable entering said cylindrical stanchion through a notched opening; and said notched opening being located substantially at the juncture of said cap and said stanchion.

\* \* \* \* \*

UNITED STATES PATENT AND TRADEMARK OFFICE
CERTIFICATE OF CORRECTION

PATENT NO. : 4,246,574
DATED : January 20, 1981
INVENTOR(S) : George E. Sanner

It is certified that error appears in the above—identified patent and that said Letters Patent is hereby corrected as shown below:

Column 4, line 13, insert "novel" before --arrangement--.

Column 5, line 66, change "L017" to --L107--.

Signed and Sealed this

First Day of June 1982

[SEAL]

Attest:

Attesting Officer

GERALD J. MOSSINGHOFF

Commissioner of Patents and Trademarks